UNITED STATES PATENT OFFICE.

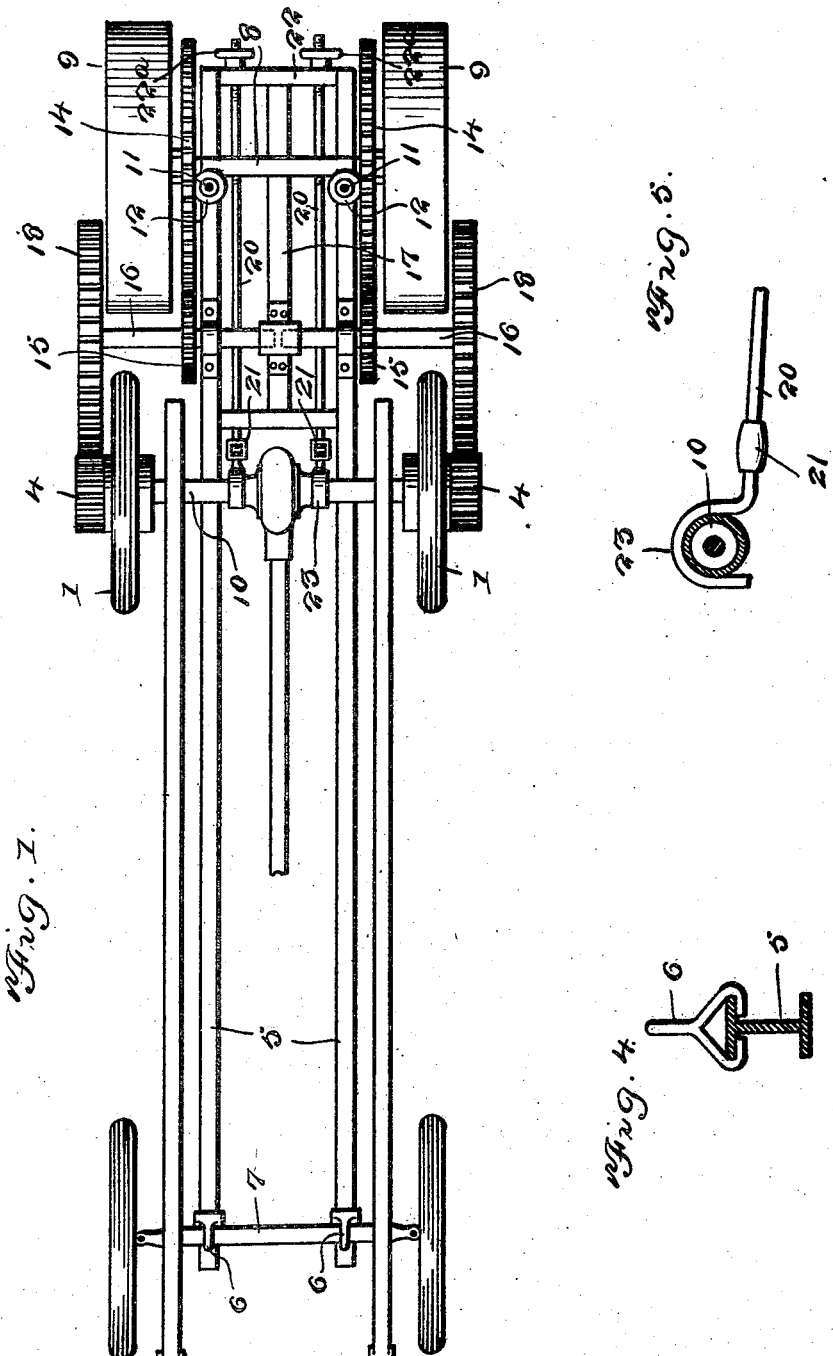

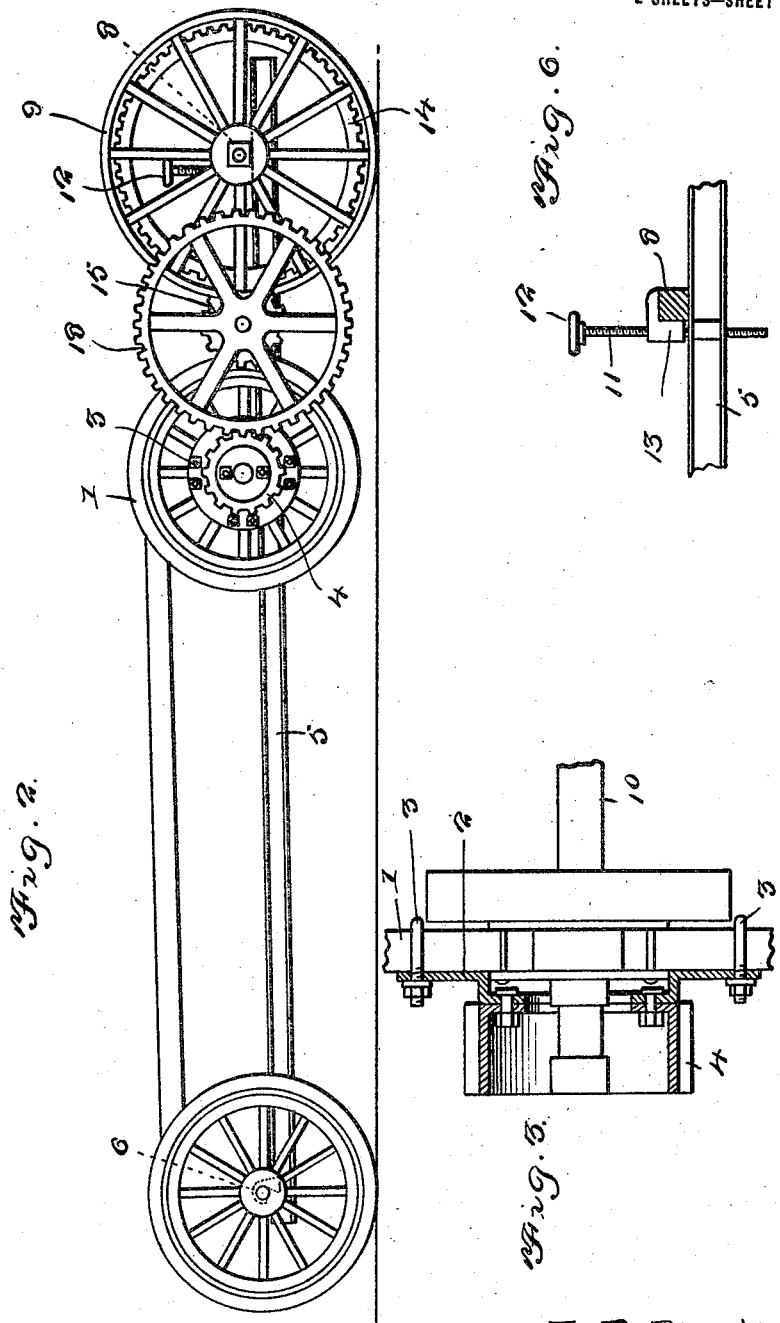

LEMI B. DENTON, OF POCATELLO, IDAHO.

TRACTOR ATTACHMENT FOR AUTOMOBILES.

1,414,938.     Specification of Letters Patent.     Patented May 2, 1922.

Application filed July 26, 1920. Serial No. 398,887.

*To all whom it may concern:*

Be it known that I, LEMI B. DENTON, a citizen of the United States, residing at Pocatello, in the county of Bannock and State of Idaho, have invented new and useful Improvements in Tractor Attachments for Automobiles, of which the following is a specification.

The object of my present invention is the provision of means in the form of an attachment whereby without the employment of skilled labor an automobile may be expeditiously and easily converted into an efficient tractor. The invention also contemplates the provision of means of such construction that when the tractor attachment is removed the automobile is left entirely free so as to be used in the ordinary manner and for the usual purposes.

To the attainment of the foregoing the invention consists in the improvement as hereinafter described and definitely claimed.

In the accompanying drawings, hereby made a part hereof:—

Figure 1 is a plan view showing my novel tractor attachment associated with so much of an ordinary automoboile as is necessary to illustrate the application of my improvement.

Figure 2 is a side elevation of the same.

Figure 3 is an enlarged diametrical section taken through one of the rear wheels of the automobile and illustrating the manner in which the said wheels are equipped for the ready attachment and detachment of the pinions or spur gears engaged with my invention.

Figures 4, 5 and 6 are detail sections showing certain features of my improvement as hereinafter explicitly described.

Similar numerals of reference designate corresponding parts in all of the views of the drawings.

The automobile illustrated by way of example may be and preferably is of the ordinary well known construction with the exception that its rear wheels 1 are provided with plates 2, bolted at 3 around the hubs of the wheels and to the spokes of the same, the bolts 3 being preferably of U-shape or shackle form.

In furtherance of my invention spur gears 4 are appropriately connected in detachable manner to the plates 2. I prefer to bolt the gears 4 to the plates 2, but manifestly any approved means may be employed for said purpose, it being simply necessary that the spur gears 4 may be readily removed from the automobile when the automobile is to be used alone in the ordinary well known manner.

In addition to the spur gears 4 my improvement includes a unit that is capable of being quickly and easily attached to and detached from the automobile. As best shown in Figure 1 the said unit includes longitudinal bars 5; preferably of I-form in cross section. On each of said bars 5 is slidably arranged a hook 6, Figure 4, designed to be engaged with the front axle 7 of the automobile. The said unit also includes a solid rear axle 8 on which are traction wheels 9. The longitudinal bars 5 are designed to extend under the rear axle casing 10 of the automobile, Figures 1 and 2, and carried by the bars 5 are upright screws 11, Figures 1, 2 and 6 with hand wheels 12 at their upper ends. The said upright screws 11 are arranged to work through and engage threaded bores in members 13, fixed on the axle 8, Figure 6, so that by adjusting the screws 11, the rear portions of the bars 5 and the rear portion of the automobile may be raised to place the rear automobile wheels 1 clear of the ground.

Fixed at the inner sides of the traction wheels 9, rotatable on fixed axle 8, are spur gears 14, and intermeshed with said spur gears are spur gears 15 on counter shafts 16 that are journaled in suitable bearings on the bars 5 and on a supplementary bar 17 disposed between and connected with the bars 5. The said counter shafts 16 are also equipped with spur gears 18 that are designed to be intermeshed with the spur gears on the automobile wheels 1. The unit referred to also comprises endwise adjustable sectional rods 20 between the sections of which swivel couplings 21, Figure 1, are interposed, said couplings being preferably arranged adjacent to the forward ends of the rods 20. The rear end portions of the rods 20 are threaded through the rear cross bar 22 carried between the bars 5 and are equipped with nuts or interiorly threaded wheels 22ª. The forward ends of the sectional rods 20 are provided with hooks 23 designed to be engaged over the rear axle casing 10 of the automobile as illustrated. By virtue of the automobile equipped as set forth, and the attachment constructed in the manner described it will be apparent that in order to apply the tractor attachment to the automobile and to convert the automobile into a tractor, it is simply necessary to back the automobile over the longitudinal bars 5, engage the hooks 6 over the front axle of the automobile, and then raise the rear end of the automobile by manipulation of the screws 11, and place the spur gears 18 on the counter shafts 16 in mesh with the spur gears on the automobile wheels by adjusting the endwise sectional rods 20 by turning the nuts 22ª and thereby retracting the rods 20. Manifestly this operation can be expeditiously carried out without the employment of skilled labor and without the assistance of tools, and it will also be appreciated that when occasion demands the use of the automobile alone, the attachment may be readily disassociated from the automobile. The hooks 6 are slidable on the bars 5 and therefore the connection with the front axle is slidable.

When the automobile is to be used alone, I prefer to detach the spur gears from the rear wheels of the automobile, and I also prefer to leave the plates for the attachment of the spur gears on the said wheels. It will readily be appreciated, however, that when it is desired to couple my novel attachment to the automobile it is a matter of but a few minutes to fasten the spur gears on the plates carried by the rear wheels of the automobile.

It will be noted from the foregoing that the countershaft of my attachment is made in two parts in order to enable the combined automobile and attachment to readily turn corners.

Having described my invention, what I claim and desire to secure by Letters-Patent, is:—

1. A tractor attachment for automobiles comprising spur gears, means to attach the same to the rear wheels of an automobile, and a unit made up of longitudinal bars adapted to extend rearwardly under the rear axle case of an automobile, hooks slidably engaged with said bars and disposed for connection to the front axle of the automobile, a rear axle equipped with traction wheels, means to adjust and adjustably fix the longitudinal bars with respect to said rear axle, counter shafts carried by the longitudinal bars and equipped with spur gears, two of which are intermeshed with the spur gears on the automobile wheels, spur gears revoluble with the traction wheels and intermeshed with the other gears of the counter shafts, and endwise movable rods adjustably connected with the rear portions of the longitudinal bars and having portions to engage the rear axle case of the automobile.

2. A tractor attachment for automobiles comprising a wheeled unit equipped to raise the rear portion of an automobile and including means to extend rearwardly under the rear axle of an automobile, endwise movable rods adjustably connected to the said means and having portions to engage the rear axle case of an automobile, hooks slidably engaged with said means and disposed for connection to the front axle of an automobile, a driving connection for transmitting motion from the rear wheels of the automobile to the drive wheels of the attachment.

3. A tractor attachment for automobiles comprising spur gears, means to attach the same to the rear wheels of an automobile, and a unit made up of longitudinal bars adapted to extend rearwardly under the rear axle case of an automobile and equipped for slidable connection to the front axle of the automobile, a rear axle equipped with traction wheels, means to adjust and adjustably fix the longitudinal bars with respect to said rear axle, counter shafts carried by the longitudinal bars and equipped with spur gears, two of which are for intermeshed engagement with the spur gears on the automobile wheels, spur gears revoluble with the traction wheels and intermeshed with the other gears of the counter shafts, and endwise movable rods adjustably connected with the rear portions of the longitudinal bars and having portions to engage the rear axle case of the automobile; the said rods being threaded through means carried by the longitudinal bars and being equipped with nuts and swivel couplings.

In testimony whereof I affix my signature.

LEMI B. DENTON.